(12) United States Patent
Lee et al.

(10) Patent No.: US 8,904,902 B2
(45) Date of Patent: Dec. 9, 2014

(54) UNIQUE MOTOR TYPE MOTOR DRIVEN COLUMN APPARATUS

(75) Inventors: Donghan Lee, Yongin-si (KR); Sanggyu Yoon, Seoul (KR); Sungjong Hong, Seoul (KR); Sangchul Ku, Seoul (KR)

(73) Assignees: Hyundai Motor Company, Seoul (KR); Kia Motors Corporation, Seoul (KR); Namyang Ind. Co., Ltd., Ansan-Shi (KR)

( * ) Notice: Subject to any disclaimer, the term of this patent is extended or adjusted under 35 U.S.C. 154(b) by 482 days.

(21) Appl. No.: 13/294,664

(22) Filed: Nov. 11, 2011

(65) Prior Publication Data

US 2012/0137818 A1 Jun. 7, 2012

(30) Foreign Application Priority Data

Dec. 6, 2010 (KR) ........................ 10-2010-0123777

(51) Int. Cl.
*B62D 1/16* (2006.01)
*B62D 1/18* (2006.01)
*B62D 1/181* (2006.01)

(52) U.S. Cl.
CPC ..................................... *B62D 1/181* (2013.01)
USPC .............................. 74/493; 280/775; 280/779

(58) Field of Classification Search
CPC ......... B62D 1/181; B62D 1/184; B62D 1/187
USPC .............. 74/492, 493, 494, 495, 499, 424.75; 280/775, 779
See application file for complete search history.

(56) References Cited

U.S. PATENT DOCUMENTS

| 2,893,258 | A | * | 7/1959 | Meyer .......................... 74/89.38 |
| 5,163,337 | A | * | 11/1992 | Herron et al. ................... 74/493 |
| 5,240,284 | A | * | 8/1993 | Takada et al. ................. 280/775 |
| 6,079,743 | A | * | 6/2000 | Grams .......................... 280/775 |
| 2004/0032121 | A1 | * | 2/2004 | Schafer et al. ................. 280/775 |
| 2005/0161930 | A1 | * | 7/2005 | Schafer et al. ................. 280/775 |
| 2011/0215560 | A1 | * | 9/2011 | Born et al. ..................... 280/775 |
| 2011/0314954 | A1 | * | 12/2011 | Matsuno et al. ................. 74/493 |

FOREIGN PATENT DOCUMENTS

| JP | 5-39043 | A | 2/1993 |
| JP | 2008-120229 | A | 5/2008 |
| JP | 2008-143229 | A | 6/2008 |
| KR | 10-0302463 | B1 | 9/2002 |
| KR | 10-2005-0018143 | A | 2/2005 |

(Continued)

*Primary Examiner* — Troy Chambers
*Assistant Examiner* — Jake Cook
(74) *Attorney, Agent, or Firm* — Morgan, Lewis & Bockius LLP (57) ABSTRACT

A unique motor type motor driven column apparatus may include a motor attached to a telescoping tube that slidably receives a column tube therein, wherein the telescoping tube may be pivotally coupled with a vehicle body by a tilt bracket, an actuating rod rotating by the motor, a tilt mechanism including a tilt clutch receiving the actuating rod therethrough and selectively engaged therebetween by a motor controller such that a rotation force of the actuating rod may be converted into a linear movement of the tilt mechanism to make a tilt motion of the column tube, and a telescoping mechanism including a telescoping clutch receiving the actuating rod therethrough and selectively engaged therebetween by the motor controller such that a rotation force of the actuating rod may be converted into a linear movement of the telescoping mechanism so as to make a telescoping motion of the column tube.

14 Claims, 10 Drawing Sheets

(56) References Cited

FOREIGN PATENT DOCUMENTS

| KR | 10-2005-0120272 A | 12/2005 |
|----|-------------------|---------|
| KR | 10-2006-0034799 A | 4/2006 |
| KR | 10-2006-0044035 A | 5/2006 |
| KR | 10-0590700 B1 | 6/2006 |
| KR | 10-0783748 B1 | 12/2007 |
| KR | 10-2009-0047923 A | 5/2009 |
| KR | 10-2009-0120272 A | 11/2009 |

* cited by examiner

UNIQUE MOTOR TYPE MOTOR DRIVEN COLUMN APPARATUS

CROSS-REFERENCE TO RELATED APPLICATIONS

The present application claims priority to Korean Patent Application Number 10-2010-0123777 filed Dec. 6, 2010, the entire contents of which application is incorporated herein for all purposes by this reference.

BACKGROUND OF THE INVENTION

1. Field of the Invention

The present invention relates to a motor driven column apparatus, and more particularly, to a unique motor type motor driven column apparatus using one unified motor to implement tilt and telescoping motions.

2. Description of Related Art

In general, motor driven power steering (MDPS) systems which are motor driven steering systems are a type which does not use fluid pressure and assists steering power with motor power, and are mainly applied to compact vehicles.

An MDPS system has a decelerator including a worm shaft and a worm wheel rotating by a motor in order to assist the steering power, and uses a motor driven column apparatus having a tilt motor and a telescoping motor to implement tilt and telescoping motions, respectively.

An MDPS motor is controlled by an MDPS ECU, and the tilt motor and the telescoping motor are controlled by a separate tilt/telescoping ECU.

As importance of improvement of fuel efficiency of vehicles is emphasized, there is a trend in that the MDPS systems should be necessarily applied to not only compact vehicles but also mid-size and full-size vehicles.

Figure 8:
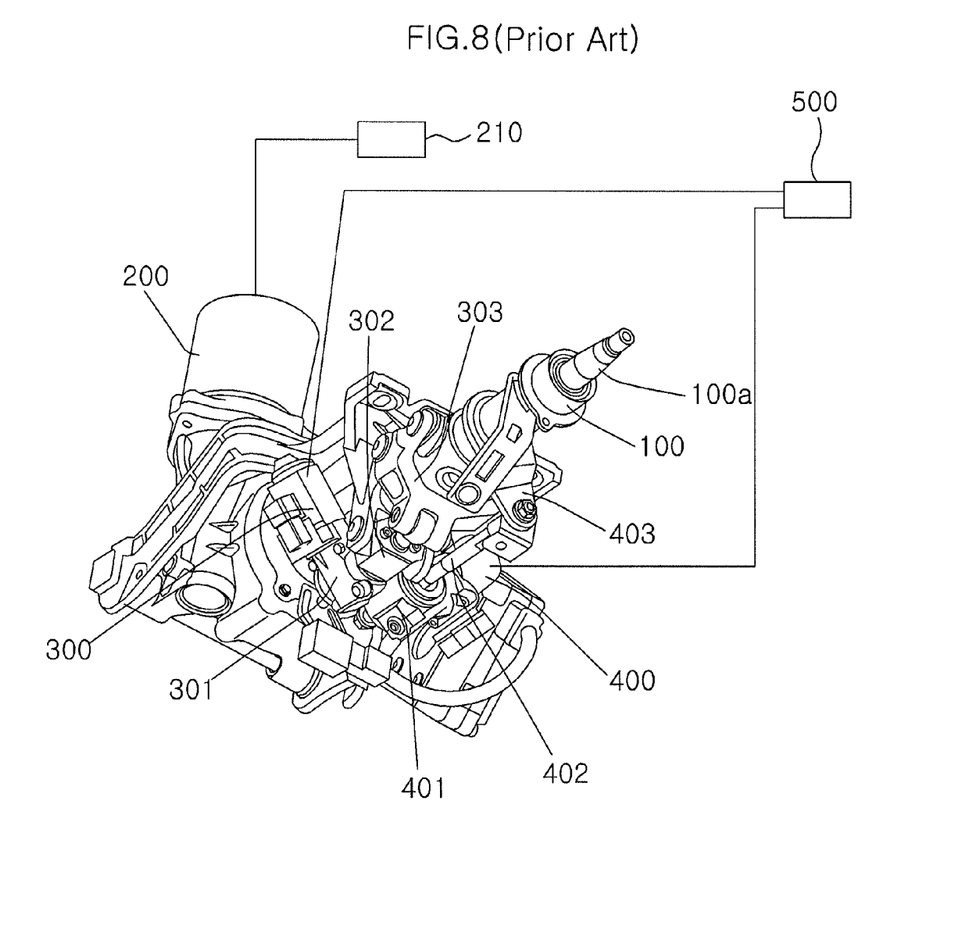
FIG. 8 is a view illustrating a configuration of a motor driven column apparatus having an MDPS motor, a tilt motor, and a telescoping motor, and an MDPS ECU and a tilt/telescoping ECU for controlling the motors according to the related art.

FIG. 8 shows a motor driven column apparatus having an MDPS motor, a tilt motor, a telescoping motor, and an MDPS ECU and a tilt/telescoping ECU for controlling those motors as described above.

As shown in FIG. 8, the motor driven column apparatus has an MDPS motor 200 and a decelerator for assisting steering power provided in a column tube 100 covering a steering shaft 100*a*, a tilt mechanism for tilting column tube 100 up and down, and a telescoping mechanism for telescoping transmission.

The tilt mechanism includes a tilt motor 300 which is a power source, a deceleration gear 301 decelerating the rotation of the motor and increasing torque, and a tilt rod 302 moving a tilt bracket 303 by an output of deceleration gear 301.

The telescoping mechanism includes a telescoping motor 400 which is a power source, a deceleration gear 401 decelerating the rotation of the motor and increasing torque, and a telescoping rod 402 moving a telescoping bracket 403 by an output of deceleration gear 401.

Also, an MDPS ECU 210 for controlling MDPS motor 200 and a tilt/telescoping ECU 500 for controlling tilt motor 300 and telescoping motor 400 are provided, respectively. MDPS ECU 210 is configured to receive a signal of an MDPS motor/angle sensor, and tilt/telescoping ECU 500 is configured to receive signals of a tilt motor/angle sensor and a telescoping motor/angle sensor.

However, since the tilt mechanism having MDPS motor 200 for assisting the steering power and the tilt mechanism having tilt motor 300 and the telescoping mechanism having telescoping motor 400 are separately provided to the motor driven column apparatus as described above, a structure for tilt and telescoping operations is complex, and especially, when the motor driven column apparatus is installed together with a knee airbag, a column collision absorption structure, etc., it is very difficult to secure a package.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a unique motor type motor driven column apparatus which uses one unified motor as a power source to implement tilt and telescoping motions, thereby simplifying a tilt and telescoping structure and making it easy to ensure a package of a knee airbag, a column collision absorption structure, etc.

In an aspect of the present invention, the unique motor type motor driven column apparatus, may include a motor attached to a telescoping tube that slidably receives a column tube therein, wherein the telescoping tube may be pivotally coupled with a vehicle body by a tilt bracket, an actuating rod rotating by the motor, a tilt mechanism including a tilt clutch receiving the actuating rod therethrough and selectively engaged therebetween by a motor controller such that a rotation force of the actuating rod may be converted into a linear movement of the tilt mechanism so as to make a tilt motion of the column tube, and a telescoping mechanism including a telescoping clutch receiving the actuating rod therethrough and selectively engaged therebetween by the motor controller such that a rotation force of the actuating rod may be converted into a linear movement of the telescoping mechanism so as to make a telescoping motion of the column tube.

The tilt mechanism may further include a first block housing, and a first moving block operably mounted in the first block housing with a predetermined gap therebetween so that the actuating rod passes through and may be engaged with the first moving block, and wherein the first moving block may include a first groove formed on an outer surface thereof.

The tilt clutch may include a plug rod which may be selectively engaged with the first groove through an opening formed in the first block housing by the motor controller.

The tilt bracket may be pivotally coupled with the first block housing and the vehicle body.

A tilt sensor may include a moving knob fixed to the first block housing, and a potentiometer installed in the telescoping tube at a position of the moving knob to sense a position change of the moving knob according to the tilt motion so as to signal tilting amount to the motor controller.

The telescoping mechanism further may include a second block housing, and a second moving block operably mounted in the second block housing with a predetermined gap therebetween so that the actuating rod passes through and may be engaged with the second moving block, and wherein the second moving block may include a second groove formed on an outer surface thereof.

The telescoping clutch may include a plug rod which may be selectively engaged with the second groove through an opening formed in the second block housing.

The telescoping mechanism further may include a telescoping rod, an end of which may be attached to the second block housing and the other end of which may be attached to a support bracket coupled to the column tube.

A telescoping sensor may include a moving knob fixed to the second block housing, and a potentiometer installed in the telescoping tube at a position of the moving knob to sense a position change of the moving knob according to the telescoping motion so as to signal telescoping amount to the motor controller.

The motor driven column apparatus according to the exemplary embodiment of the present invention uses a unified motor as a power source for implementing tilt and telescoping motions. Therefore, it is possible to simplify a tilt and telescoping structure and make it easy to ensure a package of a knee airbag, a column collision absorption structure, etc.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying illustrative drawings. The exemplary embodiment is an example and may be implemented in various different forms by those skilled in the art. Therefore, the present invention is not limited to the exemplary embodiment to be described here.

Figure 1:
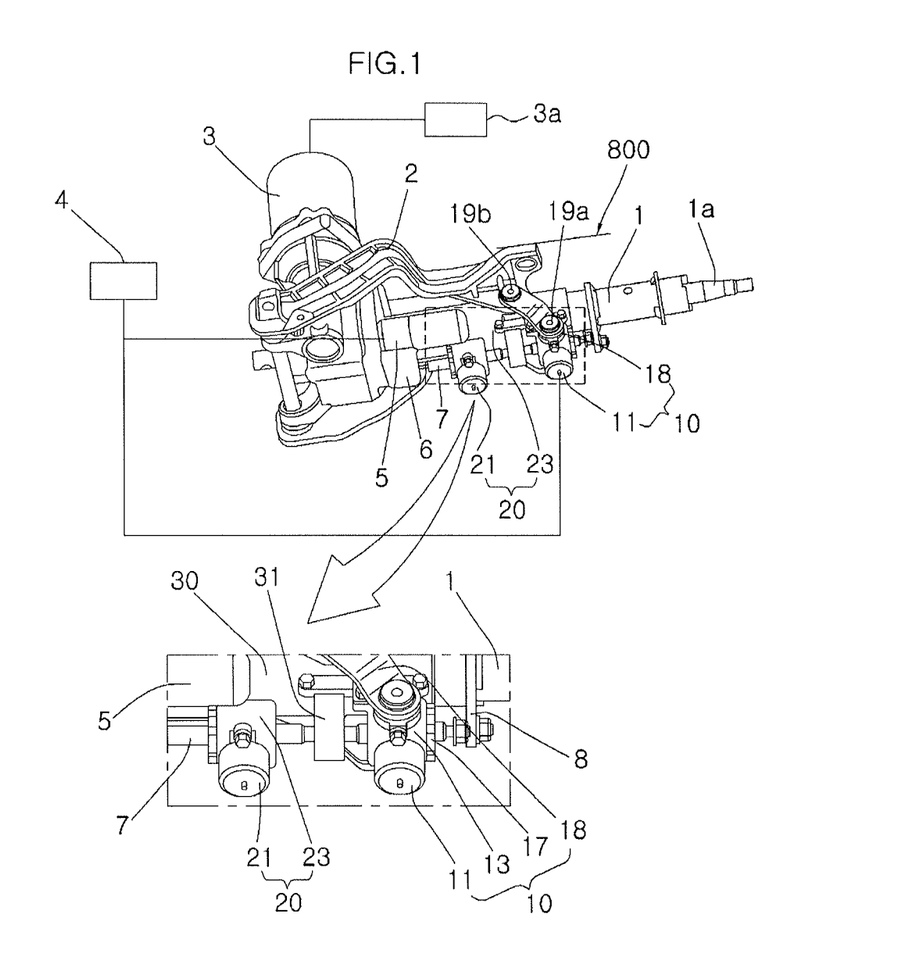
FIG. 1 is a view illustrating a configuration of a unique motor type motor driven column apparatus according to an exemplary embodiment of the present invention.

FIG. 1 is a view illustrating a configuration of a unique motor type motor driven column apparatus according to an exemplary embodiment of the present invention. Referring to FIG. 1, the motor driven column apparatus includes a column tube 1 joined with a mounting bracket 2 mounted to a vehicle body 800 and covering a steering shaft 1a, an MDPS motor 3 controlled by an MDPS motor ECU 3a and installed in column tube 1, a unified motor 5 controlled by a unified motor ECU 4, generating power for tilt and telescoping motions of steering shaft 1a, and installed in telescoping tube 30, a decelerator 6 decelerating the rotation of unified motor 5 and increasing a torque output, and an actuating rod 7 aligned along an axis direction of column tube 1 and rotating by decelerator 6.

Decelerator 6 and actuating rod 7 are connected to each other as a screw and nut structure for decelerating the rotation of unified motor 5.

Actuating rod 7 has a thread formed on the outer circumference surface along the overall length.

Actuating rod 7 is supported at one or more positions. To this end, a rod support end 31 integrally formed with a telescoping tube 30 covering column tube 1 supports the middle portion of actuating rod 7.

The motor driven column apparatus further includes a tilt mechanism 10 engaged with actuating rod 7 to implement a tilt motion by a linear movement of actuating rod 7, a telescoping mechanism 20 engaged with actuating rod 7 inside tilt mechanism 10 to implement a telescoping motion by rotation of actuating rod 7, and a tilt sensor 40 and a telescoping sensor 50 sensing a motion of tilt mechanism 10 and a motion of telescoping mechanism 20 and transmitting signals to unified motor ECU 4.

Figure 2A:
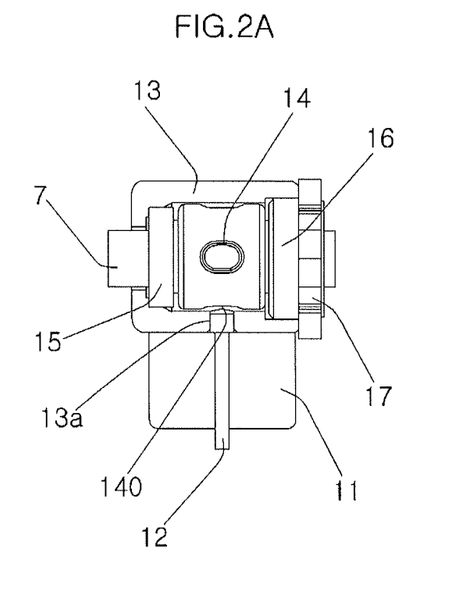
FIGS. 2A and 2B are views illustrating configurations of tilt and telescoping clutches of the unique motor type motor driven column apparatus according to the exemplary embodiment of the present invention.
Figure 2B:
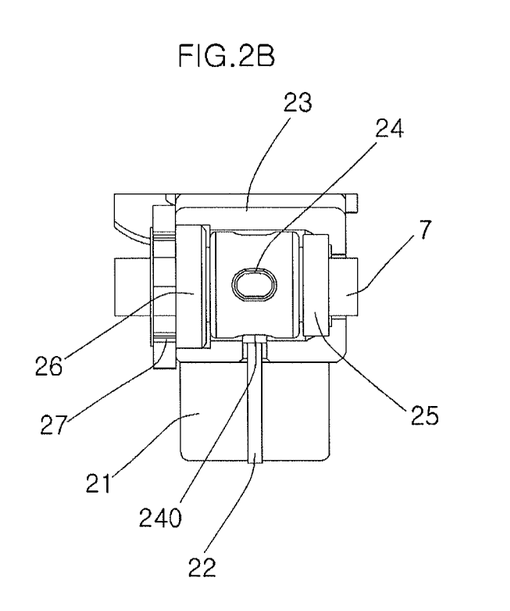

FIGS. 2A and 2B show internal configurations of clutches of the tilt and telescoping mechanisms according to the exemplary embodiment of the present invention. As shown in FIG. 2A, tilt mechanism 10 includes a tilt clutch 11, a block housing 13, a moving block 14, and a tilt bracket 18.

Tilt clutch 11 has a plug rod 12 controlled by unified motor ECU 4 to be drawn from and into tilt clutch 11. In an exemplary embodiment of the present invention, the tilt clutch 11 may be an electromagnetic actuator or pneumatic actuator but limited thereto so as to move the plug rod 12 as generally known in the art.

Actuating rod 7 passes through block housing 13, and block housing 13 has an opening 13a from and into which plug rod 12 of tilt clutch 11 is drawn. Moving block 14 is accommodated in block housing 13 with a predetermined gap therebetween and is locked by or released from plug rod 12. Actuating rod 7 is coupled with moving block 14 in a screw-coupling manner, and passes through moving block 14. Tilt bracket 18 is connected from block housing 13 to mounting bracket 2 to tilt column tube 1.

If moving block 14 is not locked by plug rod 12 of tilt clutch 11, moving block 14 rotates idle with actuating rod 7 at the same place since the moving block 14 is spaced with the block housing 13 with a gap. If moving block 14 is locked with the actuating rod 7 by plug rod 12 of tilt clutch 11 being positioned into a groove 140 formed along outer surface of the moving block 14, moving block 14 linearly moves by actuating rod 7.

A tilt motion is implemented by the above-mentioned linear movement of moving block 14.

Also, inside block housing 13, a pair of inner rings 15 and 16 is positioned on both sides (i.e. left and right) of moving block 14. Outside block housing 13, an outer ring 17 is positioned.

Figure 3A:
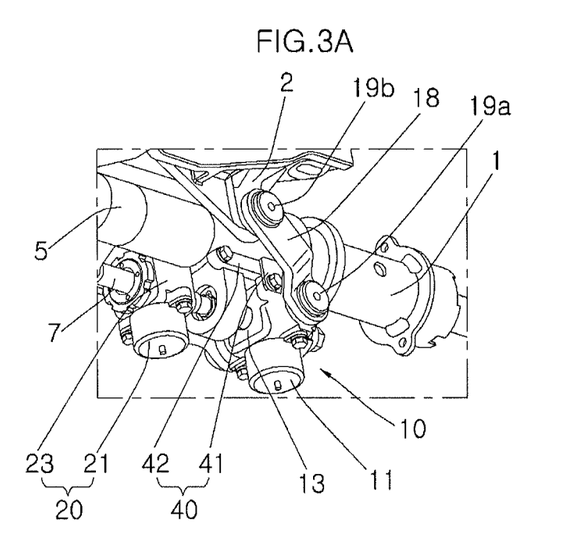
FIGS. 3A and 3B are views illustrating configurations of potentiometers of the unique motor type motor driven column apparatus according to the exemplary embodiment of the present invention.

As shown in FIG. 3A, a lower end portion of tilt bracket 18 is linked with block housing 13 by a lower end hinge shaft 19a, and an upper end portion of tilt bracket 18 is linked with mounting bracket 2 by an upper end hinge shaft 19b.

As described above, tilt bracket 18 forms a two-point hinge structure, such that, during tilt, the lower end portion of tilt bracket 18 linked by lower end hinge shaft 19a is pushed aside and rotates. In this case, upper end hinge shaft 19b acts as a rotation shaft for tilt bracket 18.

Therefore, tilt bracket 18 can tilt column tube 1 by the movement of the lower end portion linked by lower end hinge shaft 19a without a movement of the upper end portion linked by upper end hinge shaft 19b.

Tilting column tube 1 up is implemented by a counterclockwise rotation of tilt bracket 18, and tilting column tube 1 down is implemented by a clockwise rotation of tilt bracket 18.

Telescoping mechanism 20 shown in FIG. 2B includes a telescoping clutch 21, a block housing 23, a moving block 24, a telescoping rod 28, and telescoping tube 30. Telescoping clutch 21 has a plug rod 22 controlled by unified motor ECU 4 to be drawn from and into telescoping clutch 21.

In an exemplary embodiment of the present invention, the telescoping clutch 21 may be an electromagnetic actuator pneumatic actuator but limited thereto so as to move the plug rod 22 as generally known in the art.

Actuating rod 7 passes through block housing 23, and block housing 23 has an opening 23a from and into which plug rod 22 of telescoping clutch 21 is drawn. Moving block 24 is accommodated in block housing 23 and is locked or released by plug rod 22. Actuating rod 7 is coupled with moving block 24 in a screw-coupling manner, and passes through moving block 24. Telescoping rod 28 is fixed to block housing 23 and guides the movement of support bracket 8 to which the telescoping rod 28 is connected, wherein the support bracket 8 is joined with column tube 1. Telescoping tube 30 is fixed to block housing 23 to be capable of a telescoping movement and covers column tube 1.

If moving block 24 is not locked by plug rod 22 of telescoping clutch 21, moving block 24 rotates idle with actuating rod 7 at the same place since the moving block 24 is spaced with the block housing 23 with a gap. If moving block 24 is locked with actuating rod 7 by plug rod 22 of telescoping clutch 21 being positioned into a groove 240 formed along outer surface of the moving block 24, moving block 24 linearly moves by the actuating rod 7.

The telescoping motion is implemented by the above-mentioned linear movement of moving block 24.

Also, inside block housing 23, a pair of inner rings 25 and 26 is positioned on both sides (i.e. left and right) of moving block 24. Outside block housing 23, an outer ring 27 is positioned.

In the exemplary embodiment, as described above, telescoping tube 30 is integrally formed with rod support end 31 supporting the middle portion of actuating rod 7.

Figure 3B:
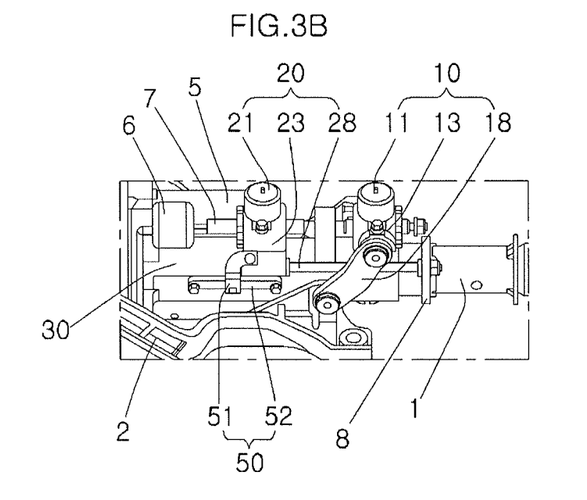

FIGS. 3A and 3B are views illustrating configurations of tilt and telescoping sensors of the unique motor type motor driven column apparatus according to the exemplary embodiment of the present invention. As shown in FIG. 3A, tilt sensor 40 includes a moving knob 41 fixed to block housing 13 in perpendicular to block housing 13 inside tilt bracket 18 to follow the tilt motion, and a potentiometer 42 horizontally installed at the position of moving knob 41 to sense a position change of moving knob 41 according to the tilt motion.

In the exemplary embodiment, as described above, tilt sensor 40 transmits a signal based on the sensed tilt motion to unified motor ECU 4.

As shown in FIG. 3B, telescoping sensor 50 includes a moving knob 51 fixed to block housing 23 in perpendicular to block housing 23 to follow the telescoping motion, and a potentiometer 52 horizontally installed at the position of moving knob 51 to sense a position change of moving knob 51 according to the telescoping motion.

In the exemplary embodiment, as described above, telescoping sensor 50 transmits a signal based on the sensed telescoping motion to unified motor ECU 4.

Figure 4:
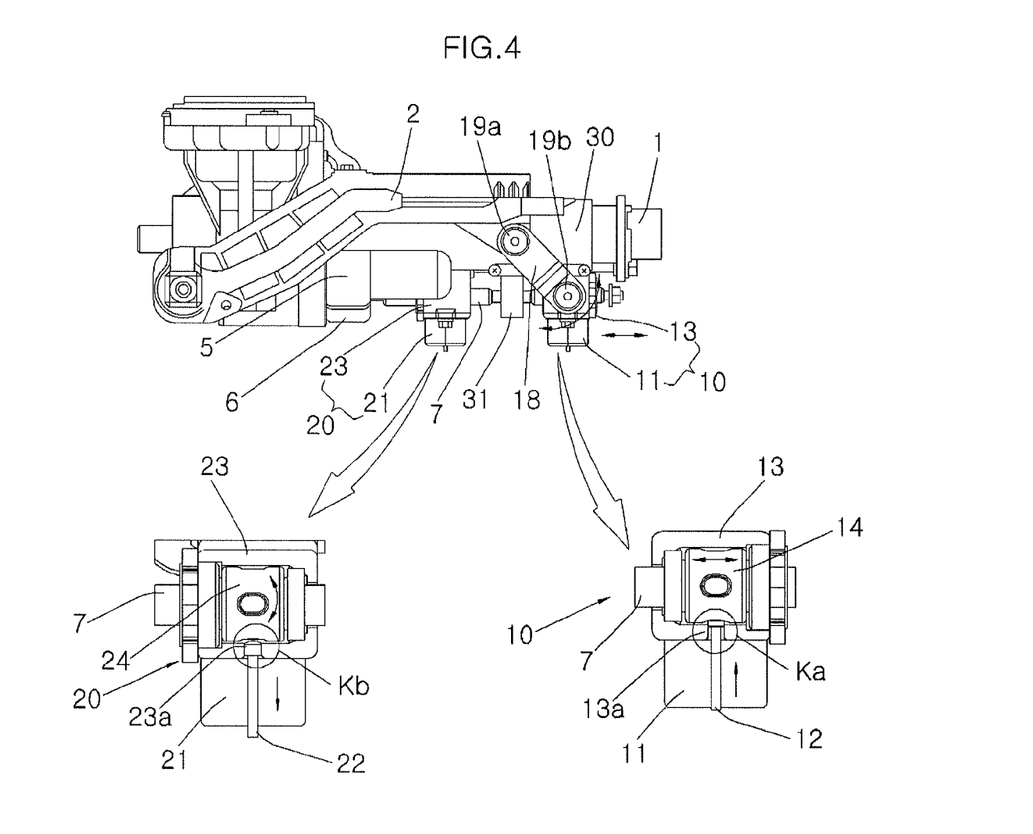
FIGS. 4 and 5 are views illustrating tilt operations of the unique motor type motor driven column apparatus according to the exemplary embodiment of the present invention.

FIG. 4 shows a tilt operation state of the unique motor type motor driven column apparatus according to the exemplary embodiment of the present invention. If a tilt motion is implemented, the rotation of unified motor 5 driven by the control of unified motor ECU 4 is decelerated by decelerator 6 and is converted into a motion for moving actuating rod 7 forward (in a case of tilting column tube 1 up) while rotating actuating rod 7.

At the same time, unified motor ECU 4 differently controls tilt clutch 11 of tilt mechanism 10 and telescoping clutch 21 of telescoping mechanism 20, such that the tilt motion can be implemented by the operation of tilt mechanism 10 without interference of telescoping mechanism 20.

That is, during tilt, unified motor ECU 4 draws plug rod 12 of tilt clutch 11 into opening 13a of block housing 13 while drawing out plug rod 22 of telescoping clutch 21 from opening 23a of block housing 23.

Therefore, moving block 14 of tilt mechanism 10 is locked by plug rod 12 (a locked state Ka), while moving block 24 of telescoping mechanism 20 is released from plug rod 22 (a released state Kb), such that moving block 14 of tilt mechanism 10 moves forward along actuating rod 7 without rotating, while moving block 24 of telescoping mechanism 20 rotates idle at the same place without moving forward along actuating rod 7.

If moving block 14 of tilt mechanism 10 moves forward as described above, the forward movement force of moving block 14 is converted into a force for pushing block housing 13 through inner ring 16.

That is, if the tilt motion is implemented, moving block 14 of tilt mechanism 10 moves forward along actuating rod 7 moving forward while rotating so as to push block housing 13. As block housing 13 is pushed, tilt bracket 18 moves up while rotating so as to tilt column tube 1 up.

The motion of tilt bracket 18 for tilting column tube 1 up is implemented by an action of lower end hinge shaft 19a and upper end hinge shaft 19b forming the two-point hinge structure of tilt bracket 18.

That is, if tilt bracket 18 receives a pushing force by block housing 13, the lower end portion of tilt bracket 18 linked by lower end hinge shaft 19a is pushed while rotating. In this case, the upper end portion of tilt bracket 18 linked by upper end hinge shaft 19b acts as the rotation shaft of tilt bracket 18. As a result, tilt bracket 18 tilts column tube 1 up by the movement of the lower end portion without the movement of the upper end portion.

In the exemplary embodiment, if unified motor 5 reversely rotates by unified motor ECU 4 (when the rotation direction of unified motor 5 for titling column tube 1 up is referred to as a normal direction), actuating rod 7 moves backward while reversely rotating, such that tilt bracket 18 clockwise rotates so as to tilt column tube 1 down. That is, an operation process for tilting column tube 1 down is the same as the above-mentioned operation process for tilting column tube 1 up, except for the operation directions of the components.

Figure 5:
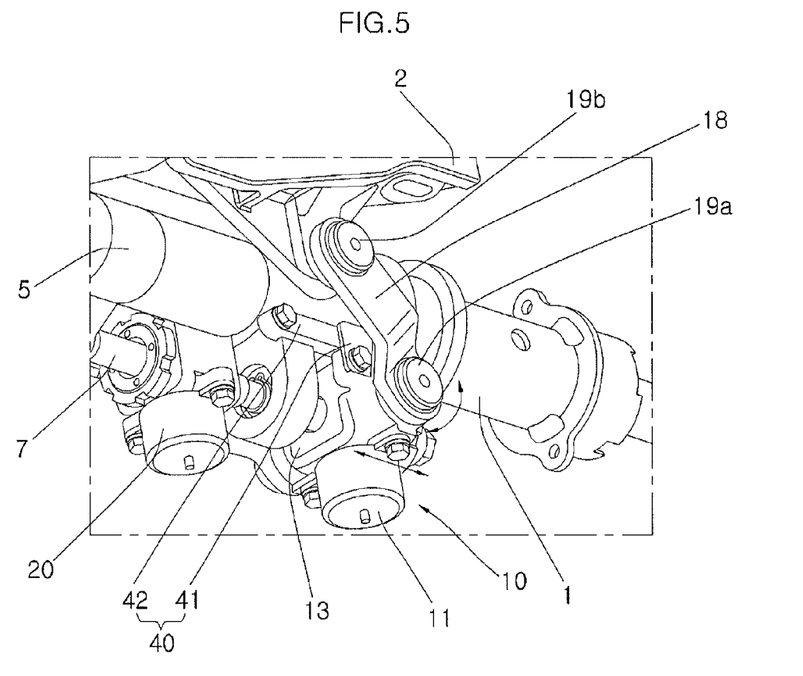

FIG. 5 shows an operation state for detecting the tilt motion during tilt according to the exemplary embodiment of the present invention. If the tilt motion is implemented, in tilt mechanism 10, block housing 13 is pushed or pulled by moving block 14 to push or pull tilt bracket 18. The motion of block housing 13 moves moving knob 41, fixed to block housing 13 in perpendicular thereto, in the same direction as block housing 13.

The motion of moving knob 41 causes a position change of moving knob 41 relative to potentiometer 42, and potentiometer 42 transmits an electric signal corresponding to the position change of moving knob 41 to unified motor ECU 4.

Therefore, unified motor ECU 4 can exactly recognize the progression degree of the tilt motion, and thus, unified motor ECU 4 can greatly improve the accuracy of the tilt motion.

Figure 6:
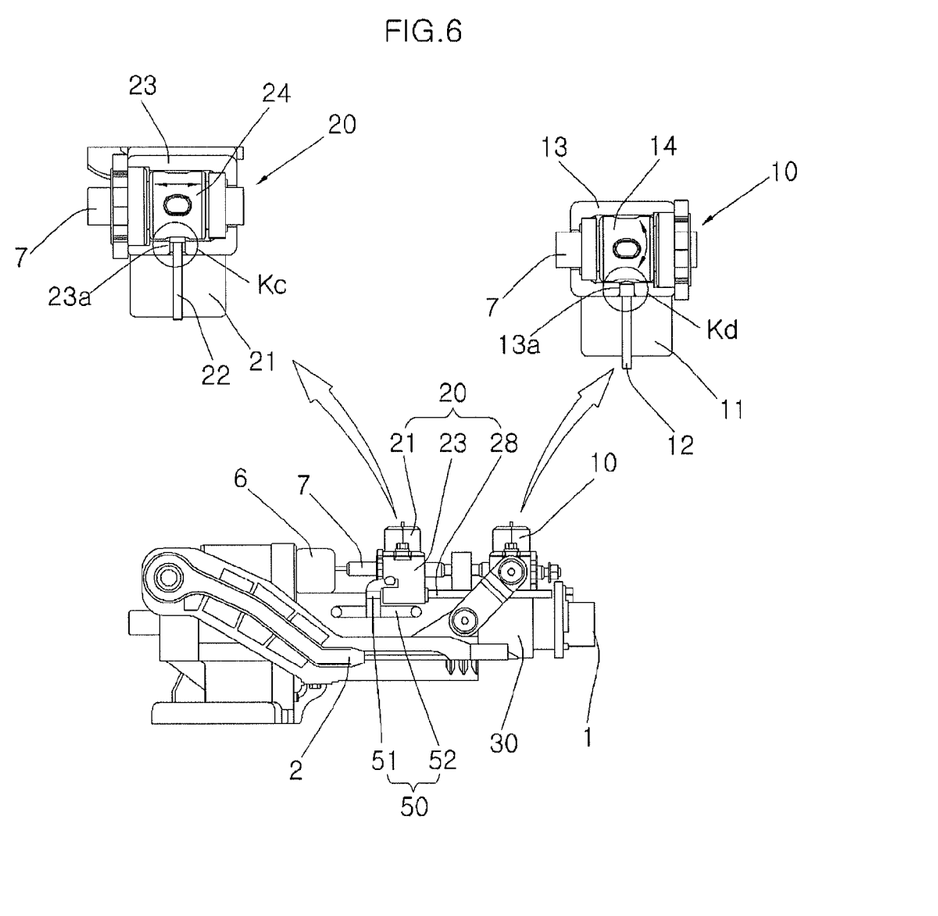
FIGS. 6 and 7 are views illustrating telescoping operations of the unique motor type motor driven column apparatus according to the exemplary embodiment of the present invention.

FIG. 6 shows a telescoping operation state of the unique motor type motor driven column apparatus according to the exemplary embodiment of the present invention. If the telescoping motion is implemented, the rotation of unified motor 5 driven by the control of unified motor ECU 4 is decelerated by decelerator 6 and then is converted into a motion for moving actuating rod 7 forward (assuming a case of performing forward telescoping) while rotating actuating rod 7.

At the same time, unified motor ECU 4 differently controls tilt clutch 11 of tilt mechanism 10 and telescoping clutch 21 of telescoping mechanism 20, such that the telescoping motion can be implemented by the operation of telescoping mechanism 20 without interference of tilt mechanism 10.

That is, during telescoping, unified motor ECU 4 draws out plug rod 12 of tilt clutch 11 from opening 13a of block housing 13 while drawing plug rod 22 of telescoping clutch 21 into opening 23a of block housing 23.

Therefore, moving block 24 of telescoping mechanism 20 is locked by plug rod 22 (locked state Kc), while moving block 14 of tilt mechanism 10 is released from plug rod 12 (released state Kd), such that moving block 24 of telescoping mechanism 20 moves forward along actuating rod 7 without rotating, while moving block 14 of tilt mechanism 10 rotates idle at the same place without moving forward along actuating rod 7.

If moving block 24 of telescoping mechanism 20 moves forward as described above, the forward movement force of moving block 24 is converted into a force for pushing block housing 23 through inner ring 26.

That is, if the telescoping motion is implemented, moving block 24 of telescoping mechanism 20 moves forward along actuating rod 7 moving forward while rotating so as to push block housing 23. As a result, block housing 23 pushes telescoping rod 28 and thereby moving the support bracket 8 joined with column tube 1.

Telescoping tube 30 pushes column tube 1 covered by telescoping tube 30 while being pushed as described above so as to implement forward telescoping to make a steering wheel closer to a driver side.

At this time, tilt mechanism 10 does not make any tilt motion according to the forward movement of actuating rod 7 as described above.

In the exemplary embodiment, if unified motor 5 reversely rotates by unified motor ECU 4 (when the rotation direction of unified motor 5 for forward telescoping is referred to as a normal direction), actuating rod 7 moves backward while reversely rotating, such that telescoping rod 28 is pulled so as to implement backward telescoping. That is, an operation process for backward telescoping is the same as the above-mentioned operation process for forward telescoping, except for the operation directions of the components.

Figure 7:
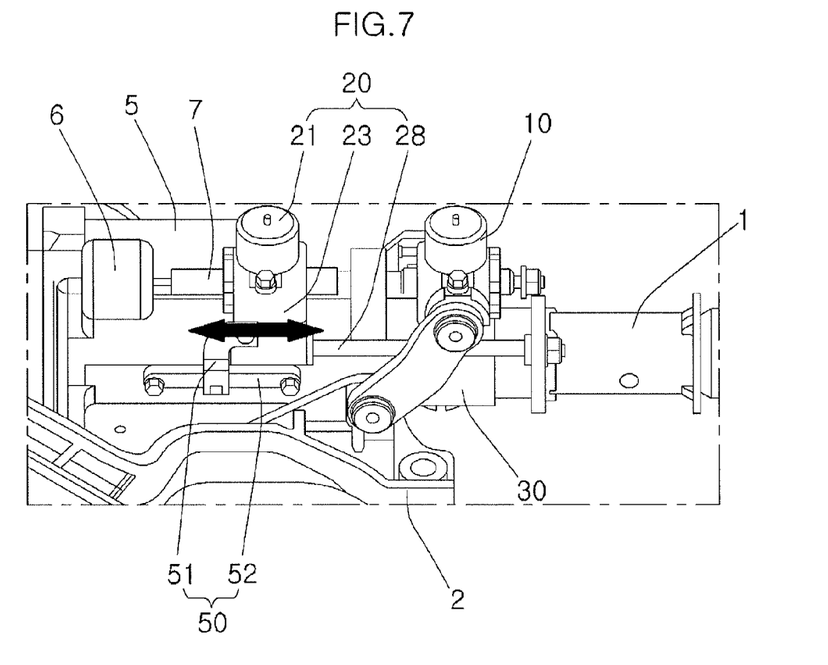

FIG. 7 shows an operation state for detecting the telescoping motion during telescoping according to the exemplary embodiment of the present invention. If the telescoping motion is implemented, in telescoping mechanism 20, block housing 23 is pushed or pulled by moving block 24 to push or pull telescoping rod 28. The motion of block housing 23 moves moving knob 51, fixed to block housing 23 in perpendicular thereto, in the same direction as block housing 23.

The motion of moving knob 51 causes a position change of moving knob 51 relative to potentiometer 52, and potentiometer 52 transmits an electric signal corresponding to the position change of moving knob 51 to unified motor ECU 4.

Therefore, unified motor ECU 4 can exactly recognize the progression degree of the telescoping motion, and thus, unified motor ECU 4 can greatly improve the accuracy of the telescoping motion.

As described above, the motor driven column apparatus according to the exemplary embodiment includes tilt mechanism 10 having tilt clutch 11 converting the rotation force of actuating rod 7 moving by one unified motor 5 into a linear movement force for the tilt motion, and telescoping mechanism 20 having telescoping clutch 21 converting the rotation force of actuating rod 7 into a linear movement force for the telescoping motion. Therefore, the simple configuration with one unified motor 5 makes it easy to secure a package of a knee airbag, a column collision absorption structure, etc.

Further, the motor driven column apparatus according to the exemplary embodiment further includes potentiometers 42 and 52 sensing the tilt motion and the telescoping motion and transmitting the electric signals to unified motor ECU 4. Therefore, the accuracy of the tilt and telescoping motions is greatly improved, and the reliability is also greatly improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A unique motor type motor driven column apparatus, comprising:
   a motor which is mounted in a column tube, wherein the column tube is joined with a mounting bracket mounted to a vehicle body and covers a steering shaft controlled by a unified motor engine control unit ("ECU");
   an actuating rod supported at one or more positions by the column tube, and rotatable by the motor;

a tilt mechanism including a tilt clutch converting a rotation force of the actuating rod into a linear movement force for a tilt motion by control of the unified motor ECU;

a telescoping mechanism including a telescoping clutch converting a rotation force of the actuating rod into a linear movement force for a telescoping motion by control of the unified motor ECU; and tilt and telescoping sensors sensing the tilt motion of the tilt mechanism and the telescoping motion of the telescoping mechanism and transmitting electric signals to the unified motor ECU;

wherein the telescoping mechanism is positioned inside the tilt mechanism;

wherein the tilt mechanism further includes a first moving block and a first block housing accommodating the first moving block through which the actuating rod passes, and the tilt clutch includes a first plug rod which is selectively drawn into a first opening formed in the first block housing to lock the first moving block so that the first moving block moves linearly or drawn from the first opening to release the locked state of the first moving block so that the first moving block rotates idly; and wherein the telescoping mechanism further includes a second moving block and a second block housing accommodating the second moving block through which the actuating rod passes, the telescoping clutch includes a second plug rod which is selectively drawn into a second opening formed in the second block housing to lock the second moving block so that the second moving block moves linearly or drawn from the second opening to release the locked state of the second moving block so that the second moving block rotates idly.

2. The unique motor type motor driven column apparatus as defined in claim 1, wherein the actuating rod has a thread formed on an outer circumference surface along the overall length, an end portion of the actuating rod is supported by a support bracket joined with the column tube, and a middle portion of the actuating rod is supported by a telescoping tube covering the column tube.

3. The unique motor type motor driven column apparatus as defined in claim 1, wherein the tilt mechanism is joined outside a block housing accommodating a moving block through which the actuating rod passes, and the tilt clutch includes a plug rod which is drawn into an opening formed in the block housing to lock the moving block so that the moving block linearly moves or is drawn from the opening to release the locked state of the moving block so that the moving block rotates at the same place, and a tilt bracket includes a lower end portion linked with the first block housing by a lower end hinge shaft and an upper end portion linked with the mounting bracket by an upper end hinge shaft.

4. The unique motor type motor driven column apparatus as defined in claim 3, wherein inside the tilt bracket, the tilt sensor is installed to be fixed to the first block housing.

5. The unique motor type motor driven column apparatus as defined in claim 4, wherein the tilt sensor includes a moving knob fixed to the first block housing perpendicular to the first block housing, and a potentiometer horizontally at a position of the moving knob to sense a position change of the moving knob according to the tilt motion.

6. The unique motor type motor driven column apparatus as defined in claim 1, wherein the telescoping mechanism is joined outside a block housing accommodating a moving block through which the actuating rod passes, the telescoping clutch include a plug rod which is drawn into an opening formed in the block housing to lock the moving block so that the moving block linearly moves or is drawn from the opening to release the locked state of the moving block so that the moving block rotates at the same place, and a telescoping tube is fixed to the second block housing with covering and covers the column tube.

7. The unique motor type motor driven column apparatus as defined in claim 6, wherein the telescoping sensor is installed in the second block housing to be fixed to the second block housing.

8. The unique motor type motor driven column apparatus as defined in claim 7, wherein the tilt sensor includes a moving knob fixed to the first block housing perpendicular to the first block housing, and a potentiometer horizontally installed in the telescoping tube at a position of the moving knob to sense a position change of the moving knob according to the tilt motion.

9. The unique motor type motor driven column apparatus as defined in claim 3, wherein, inside the first block housing, a pair of inner rings is positioned on both sides, that is, left and right, of the first moving block, and outside the first block housing, an outer ring is positioned.

10. A unique motor type motor driven column apparatus, comprising:

a motor attached to a telescoping tube that slidably receives a column tube therein, wherein the telescoping tube is pivotally coupled with a vehicle body by a tilt bracket;

an actuating rod rotatable by the motor;

a tilt mechanism including:

a tilt clutch receiving the actuating rod therethrough and selectively engaged therebetween by a motor controller such that a rotation force of the actuating rod is converted into a linear movement of the tilt mechanism so as to make a tilt motion of the column tube;

a first block housing; and a first moving block operably mounted in the first block housing with a predetermined gap therebetween so that the actuating rod passes through and is engaged with the first moving block, wherein the first moving block includes a first groove formed on an outer surface thereof, and wherein the tilt clutch includes a first plug rod which is selectively engaged with the first groove through an opening formed in the first block housing by the motor controller; and a telescoping mechanism including:

a telescoping clutch receiving the actuating rod therethrough and selectively engaged therebetween by the motor controller such that a rotation force of the actuating rod is converted into a linear movement of the telescoping mechanism so as to make a telescoping motion of the column tube;

a second block housing; and a second moving block operably mounted in the second block housing with a predetermined gap therebetween so that the actuating rod passes through and is engaged with the second moving block, wherein the second moving block includes a second groove formed on an outer surface thereof, and wherein the telescoping clutch includes a second plug rod which is selectively engaged with the second groove through an opening formed in the second block housing.

11. The unique motor type motor driven column apparatus as defined in claim 10, wherein the tilt bracket is pivotally coupled with the first block housing and the vehicle body.

12. The unique motor type motor driven column apparatus as defined in claim 10, wherein a tilt sensor includes a moving knob fixed to the first block housing, and a potentiometer installed in the telescoping tube at a position of the moving knob to sense a position change of the moving knob according to the tilt motion so as to signal tilting amount to the motor controller.

13. The unique motor type motor driven column apparatus as defined in claim 10, wherein the telescoping mechanism further includes a telescoping rod. an end of which is attached to the second block housing and the other end of which is attached to a support bracket coupled to the column tube.

14. The unique motor type motor driven column apparatus as defined in claim 10, wherein a telescoping sensor includes a moving knob fixed to the second block housing, and a potentiometer installed in the telescoping tube at a position of the moving knob to sense a position change of the moving knob according to the telescoping motion so as to signal telescoping amount to the motor controller.

\* \* \* \* \*